United States Patent
Rowe

(10) Patent No.: US 6,917,123 B2
(45) Date of Patent: Jul. 12, 2005

(54) SYNCHRONIZED POWER-UP FOR MULTIPLE VOLTAGE SYSTEM

(75) Inventor: Jeffrey R. Rowe, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 150 days.

(21) Appl. No.: 10/254,434

(22) Filed: Sep. 25, 2002

(65) Prior Publication Data

US 2004/0056532 A1 Mar. 25, 2004

(51) Int. Cl.[7] .................................................. H02J 1/04
(52) U.S. Cl. ........................................... 307/43; 307/18
(58) Field of Search ................................. 323/266, 268, 323/282; 307/11, 43, 18

(56) References Cited

U.S. PATENT DOCUMENTS

| | | | | |
|---|---|---|---|---|
| 3,359,552 A | * | 12/1967 | Holt, Jr. ...................... | 341/133 |
| 3,953,778 A | | 4/1976 | Bray ........................... | 318/685 |
| 3,976,975 A | | 8/1976 | Cochran .................. | 340/172.5 |
| 4,081,735 A | | 3/1978 | Bray ........................... | 318/696 |
| 4,107,782 A | | 8/1978 | Cochran ...................... | 364/706 |
| 4,134,117 A | | 1/1979 | Robinson et al. ........... | 343/103 |
| 4,164,697 A | | 8/1979 | Everett ....................... | 318/696 |
| 4,172,990 A | | 10/1979 | Everett ....................... | 318/685 |
| 4,420,717 A | | 12/1983 | Wallace et al. ............. | 318/696 |
| 5,142,217 A | | 8/1992 | Gontowski, Jr. ............ | 323/272 |
| 5,457,624 A | * | 10/1995 | Hastings ..................... | 363/127 |
| 5,861,737 A | * | 1/1999 | Goerke et al. .............. | 323/282 |
| 6,121,760 A | * | 9/2000 | Marshall et al. ............ | 323/282 |
| 6,172,884 B1 | * | 1/2001 | Lanni ....................... | 363/21.05 |
| 6,204,706 B1 | | 3/2001 | Horvath ....................... | 327/198 |
| 6,215,286 B1 | | 4/2001 | Scoones et al. ............. | 323/222 |
| 6,229,293 B1 | * | 5/2001 | Farrenkopf .................. | 323/288 |
| 6,275,016 B1 | | 8/2001 | Inanov ....................... | 323/224 |
| 6,288,523 B2 | | 9/2001 | Antoszkiewicz ............ | 323/267 |
| 6,366,067 B1 | * | 4/2002 | Zhang et al. ................ | 323/282 |
| 6,369,559 B1 | | 4/2002 | Ashrafzadeh ............... | 323/283 |
| 6,396,169 B1 | * | 5/2002 | Voegeli et al. ............... | 307/52 |
| 6,429,706 B1 | * | 8/2002 | Amin et al. ................. | 327/143 |
| 6,430,070 B1 | * | 8/2002 | Shi et al. ....................... | 363/97 |
| 6,445,326 B1 | * | 9/2002 | Donovan et al. ........... | 341/155 |
| 6,445,623 B1 | | 9/2002 | Zhang et al. .......... | 365/189.11 |
| 6,492,793 B1 | | 12/2002 | Bentolila et al. ........... | 323/282 |
| 6,535,408 B2 | * | 3/2003 | Lin et al. ..................... | 363/127 |
| 6,643,147 B2 | * | 11/2003 | Kirn ........................... | 363/19 |
| 6,674,271 B2 | * | 1/2004 | Choo et al. ................. | 323/282 |
| 6,700,359 B2 | * | 3/2004 | Daniels et al. .............. | 323/268 |
| 6,850,048 B2 | * | 2/2005 | Orr et al. ..................... | 323/299 |
| 2002/0125868 A1 | * | 9/2002 | Pohlman et al. ............ | 323/282 |

OTHER PUBLICATIONS

Daniels, David.; Fowler, Tom., "Dual Output Power Supply Sequencing for High Performance Processors", Jul. 2002, p. 1–7.*

Rush, Brian., "Power Supply Sequencing for Low Voltage Processors", EDN, Sep. 2000, pp115–118.*

Texas Instrument Incorporated, Data Sheet for TPS 54610, Jun. 2001.*

* cited by examiner

*Primary Examiner*—Brian Sircus
*Assistant Examiner*—Brett Squires
(74) *Attorney, Agent, or Firm*—Baker Botts L.L.P.

(57) ABSTRACT

A power-up control circuit controls the initial application of power to a system having multiple loads and multiple voltage supply levels. The control circuit causes the power to each load to rise equally, and limits the voltage levels to all loads to the lowest voltage being controlled by the control circuit. As each load reaches its target voltage, its voltage no longer limits the control circuit. The voltages to the remaining loads continue to rise, and loads whose target voltages are reached continue to drop out of the control circuit, until each load is receiving its target voltage.

20 Claims, 2 Drawing Sheets

SYNCHRONIZED POWER-UP FOR MULTIPLE VOLTAGE SYSTEM

TECHNICAL FIELD

This invention relates to electronic circuits, and more particularly to a method for powering up an electrical system having multiple loads that use different voltage levels.

BACKGROUND

Many electrical circuits are "multiple voltage systems", in the sense that they require multiple supply voltages of differing voltage levels. These applications typically require a controlled application of power during power-up and power-down.

Controlled sequencing, with selected voltages applied before others during power up, has been used to solve some problems that arise in multiple voltage systems. DSPs and other multi-voltage microprocessors usually require their I/O voltage to be present before applying the core voltage, or vice versa. Another situation that requires sequencing is a board that includes a secondary controller like a graphics controller along with the main CPU. To avoid uncontrolled outputs on the graphic display, the CPU must be up and running before the graphics controller receives power.

Often, however, it is voltage levels rather than a particular sequence of voltage application that cause problems. In particular, today's more complicated semiconductor chips and chip sets often operate at more than one voltage level. Groups of pins may each operate at a different voltage level. To prevent latch-up, one approach has been to control the sequence in which supply voltages are applied to the chip. In general, controlled power sequencing is critical to the operation of many computer-oriented systems.

As a specific example, for a semiconductor circuit that operates on bipolar supply voltages, the most positive voltage can be applied first, then a logic supply, and the negative supply voltage last. Violating this rule can cause latch-up within the semiconductor. Analog circuits, such as multiplexers, can also have latch-up problems.

SUMMARY

One aspect of the invention is a power-up control circuit for controlling the initial application of power to a system having multiple loads and multiple voltage supply levels. The control circuit causes the power to each load to rise equally, and limits the voltage levels to all loads to the lowest voltage being controlled by the control circuit. As each load reaches its target voltage, its voltage no longer limits the control circuit. The voltages to the remaining loads continue to rise, and loads whose target voltages are reached continue to drop out of the control circuit, until each load is receiving its target voltage.

To implement the invention, a feedback regulator is connected between each load's voltage supply and the load. Each feedback regulator controls the voltage delivered to the associated load by limiting that voltage to the level of a continuously increasing setpoint signal. This setpoint signal is determined by a minimum voltage finder that receives the outputs of the feedback regulators and finds the minimum of these output voltages. A cutout circuit is associated with each load, and when the voltage delivered to that load reaches the voltage required by that load, that load's voltage is no longer considered by the voltage finder and thus no longer limits the setpoint.

An advantage of the invention is that it could reduce product misfunctions or defects that could result from latch-up during power up.

DETAILED DESCRIPTION

The following description is directed to methods and circuits for powering up a multiple voltage system in a controlled manner. These methods and circuits are directed to multiple voltage systems in which it is desirable to equalize the voltage to all loads during power-up. Essentially, the voltages to all loads are held to a minimum voltage selected from the voltage outputs of feedback regulators placed on the input voltage lines to the loads. Each load has a "target voltage", and when the power-up reaches that voltage level, the output of its feedback regulator no longer affects the minimum voltage. This permits the remaining voltages to rise equally to the next target voltage, and so on.

Figure 1:
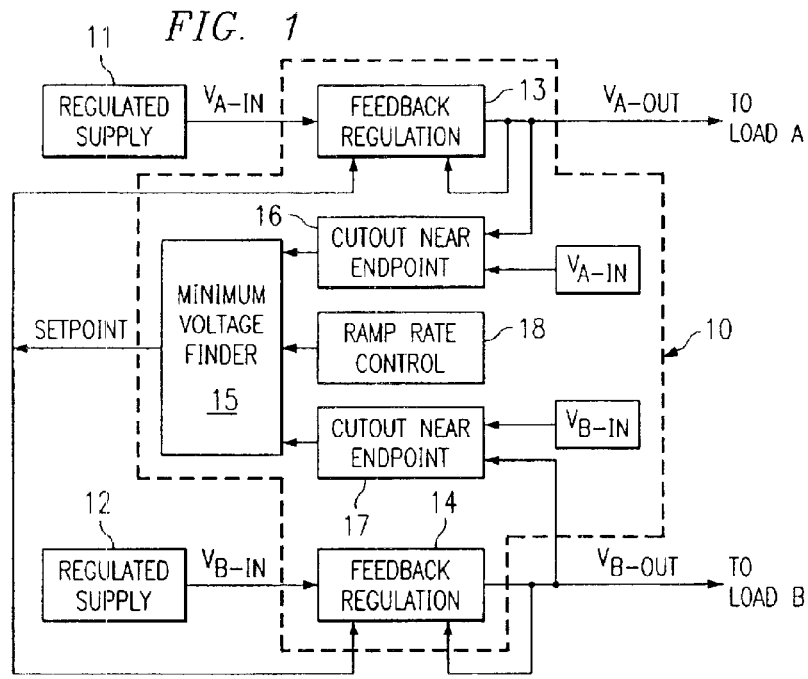
FIG. 1 illustrates a first embodiment of a power-up control circuit.

FIG. 1 illustrates a first embodiment of the invention, a power-up control circuit 10. In the example of FIG. 1, the multiple voltage system is represented by two loads, Load A and Load B. Each of these loads requires a different target voltage, herein referred to as Va-target and Vb-target, respectively.

It is assumed that the multiple voltage system has a power supply to supply the proper voltage for each load, identified in FIG. 1 as power supplies 11 and 12. The voltages from these supplies are identified as Va-in and Vb-in. These "input voltages" are the same as the target voltages, and in the absence of control circuit 10, the loads would independently ramp-up to their respective target voltages at power-up.

It should be understood that the illustration of only two loads in FIG. 1 is for purposes of simplicity of description. The concepts described herein could be extended and applied to a multiple voltage circuit having three or more loads. Each of those additional loads may or may not have a different target voltage. If any two or more loads have the same target voltage, they would power up together, in the same manner as a single load at that voltage.

Power-up control circuit 10 has a feedback regulator 13, 14 associated with each load. Thus, in the example of FIG. 1, Va-in and Vb-in pass through their associated feedback regulator 13, 14 prior to reaching Load A or Load B, respectively. In addition to a Vin signal, each feedback regulator 13, 14 receives two input signals: a setpoint signal and a feedback signal, Va-out or Vb-out.

As explained below, at the outset of power-up, each feedback regulator 13, 14 limits its associated output voltage (Va-out or Vb-out) to a level that is the minimum of the instantaneous value of either. For example, if Va-out is less than Vb-out, both feedback regulators 13,14 limit their V-out voltages from exceeding Va-out. But when Va-out nears Va-in, Va-out no longer limits feedback regulator 14, and Vb-out is allowed to ramp up to Vb-in.

For a system having three of more loads, the power up procedure may be stated more generally. After the lowest target voltage is reached, the power-up circuit 10 no longer considers that load's voltage as limiting. The voltages for the remaining loads continue to rise until the next higher target voltage is reached, then that load's voltage is no longer limiting. This process continues until all loads are satisfied.

An instantaneously varying setpoint signal is delivered to each feedback regulator 13, 14. The setpoint is determined by a minimum voltage finder 15, which finds the minimum of the V-out voltages from feedback regulators 13 and 14.

In general, voltage finder 15 may be any circuit capable of selecting the minimum voltage from among a number of independent signals. A simple analog example is described below in connection with FIG. 4. Other analog voltage finding circuits could be implemented as analog computing circuits or operational amplifier circuits.

As stated above, each feedback regulator 13, 14 receives a setpoint from voltage finder 15. At the beginning of power-up, the voltages to both Load A and Load B are held down to the current setpoint (which is the minimum of Va-out or Vb-out). Essentially, feedback regulators 13, 14 function to equalize their respective V-out's to a continuously varying setpoint, which is generally increasing in value (although it may undergo slight instantaneous decreases).

When the output of a feedback regulator 13, 14 reaches the target voltage of the associated load, that output no longer affects the determination of the setpoint. This is achieved by cutout switches 16, 17 connected between the outputs of each feedback regulator 13, 14 and the minimum voltage finder 15.

Cutout circuits 16, 17 are essentially comparators. Each cutout circuit 16, 17 receives, as a reference endpoint, the input voltage for its associated load. The use of the input voltages as the endpoint is for purposes of simplicity of explanation herein. The endpoint references could be derived from a separate reference generator, which would avoid a possible fault condition if the input voltages were incorrect. Also, in practice, the value of the reference endpoints could be slightly higher than the V-in values, such as V-in plus an offset added to accommodate a diode drop.

As explained below in connection with FIG. 2, cutout switches 16,17 may be simple comparator type circuits that compare V-out to the endpoint reference voltage and open a switch when the two signals match. Thus, for example, when the output of feedback regulator 13 nears Va-in, cutout switch 16 associated with Load A opens. Va-out is no longer the limiting voltage for the voltage finder 15, and voltage finder 15 finds a new minimum voltage from the remaining v-out voltages. In the example of FIG. 1, the new minimum voltage is Vb-out, and the next setpoint would be determined by that value. However, if there were a third load requiring a voltage Vc-out greater than Va-out, after all loads reach Va-out, the next setpoint would be the minimum of Vb-out and Vc-out. This process continues, with each new setpoint being the minimum of all output voltages, until the highest load voltage has been reached.

An optional controlled ramp generator 18 controls the rate at which power increases, such that power-up circuit 10 controls the rate of power-up as well as equalizes the voltage to each load to the level of a setpoint. The ramp generator 18 could be as simple as an RC circuit. In operation, when the power-up process begins, ramp generator 18 ramps up from zero voltage and controls the rate of voltage rise. The ramp rate set by ramp generator 18 forces the voltage to each load to be the minimum of the ramp voltage and all supply voltages. An example of an implementation of ramp generator 18 is illustrated in FIG. 2.

Figure 2:
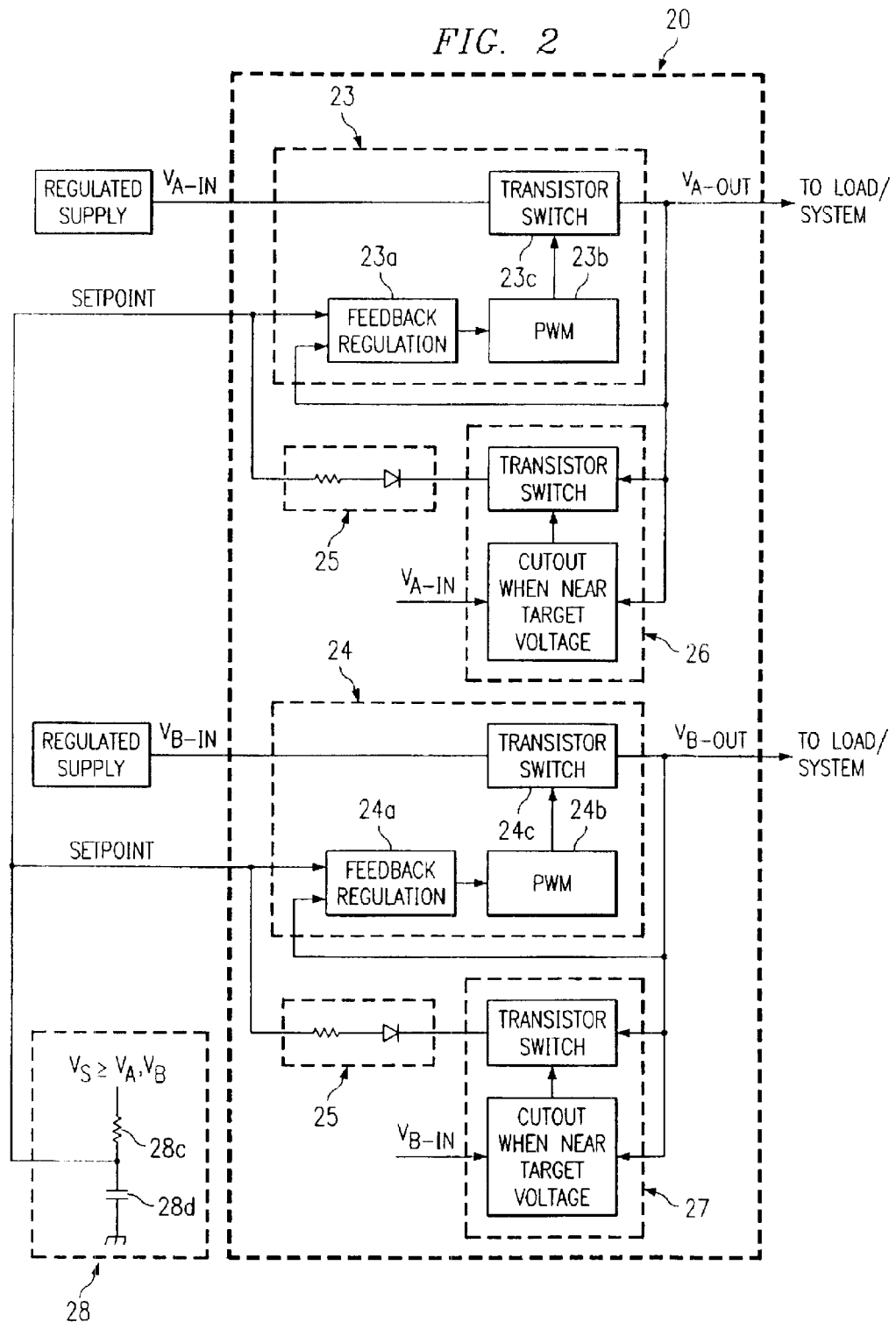
FIG. 2 illustrates a second embodiment of a power-up control circuit.

FIG. 2 illustrates a second embodiment of the invention, a power-up circuit 20. Like circuit 10, circuit 20 uses feedback regulation on the input voltage lines to the loads, as a means to equalize the voltages to each load as they ramp up.

As in the control circuit 10 of FIG. 1, the feedback regulators 23a and 24a receive a setpoint signal and a feedback signal, Va-out and Vb-out, respectively. In the example of FIG. 2, feedback regulators 23 and 24 reduce Va-in and Vb-in, respectively, by means of a pulse width modulators (PWM) 23b and 24b. The pulse width modulators 23b and 24b turn transistor switches 23c and 24c on and off, with the duty cycles being longer or shorter depending on the desired adjustment of Va-in and Vb-in. In effect, the transistor switches 23c, 24c "chop" the connection between V-in and V-out.

More generally stated, feedback regulators 23 and 24 are each a feedback circuit that uses pulse width modulation to drive a transistor pass element. After the feedback regulator output nears a target voltage, the transistor is fully on. The implementation may require current limiting and filtering features, such as an inductor and capacitor like those used in a buck regulator configuration.

Like voltage finder 15 of FIG. 1, voltage finder 25 determines the setpoint as the lowest of the voltages still ramping up. The setpoint varies continuously, generally increasing as the V-outs from the feedback regulators ramp up.

Figure 4:
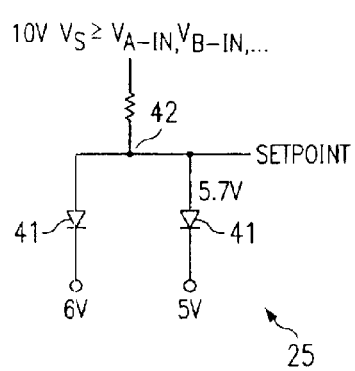
FIG. 4 illustrates an example of the minimum voltage finder circuit.

FIG. 4 illustrates minimum voltage finder 25 in further detail. A diode 41 is associated with each feedback regulator 23, 24. For simplicity of description, the diodes are treated as ideal, with zero forward conduction voltage. The cathodes of diodes 41 are connected to the feedback regulator outputs. The anodes are connected to a resistor, which has its other end connected to a reference voltage, Vs, which is equal to or greater than any of the v-in voltages. The setpoint node 42 represents the voltage at all anodes. The result is that the setpoint is at the minimum of the V-out voltages, which is 5 volts in the example of FIG. 4. The setpoint moves off zero to the minimum voltage when ramp generator 28 moves off zero. In actual implementation, the voltage finder diode voltage or other means will assure that the setpoint moves to a voltage somewhat higher than the instantaneous minimum output voltage, to begin and continue output ramping.

Referring again to FIG. 2, cutout switches 26 and 27 cause a transistor switch to open when V-out to a load reaches a reference voltage, which is typically at or near V-in. As a result, the voltage finder 25 does not receive that V-out when determining the setpoint.

Ramp rate generator 28 receives a source voltage, Vs, which is equal to or greater than Va-in and Vb-in. The ramp control circuit 28 is essentially an RC circuit, with resistor 28c and capacitor 28d. The ramp rate circuit 28 ensures that the voltage to each load rises at an equal rate, by equalizing the rate of rise of the setpoint. To be the controlling rate, the generated ramp rate is made to be slower than the rate that would otherwise occur in the limiting combination of supply, regulator, and load. This may be required if the output voltage differences or instabilities could result due to the response characteristics of the supplies and regulators.

In the embodiments of FIGS. 1 and 2, the implementing circuits have been analog circuits. A power-up process in accordance with the invention could also be implemented with digital circuitry.

The control features described herein could be incorporated into the power supply circuit(s). Also, additional features could be incorporated into the power-up circuit, such as to implement fault detection and reporting, as well as "power good" signal generation.

Figure 3:
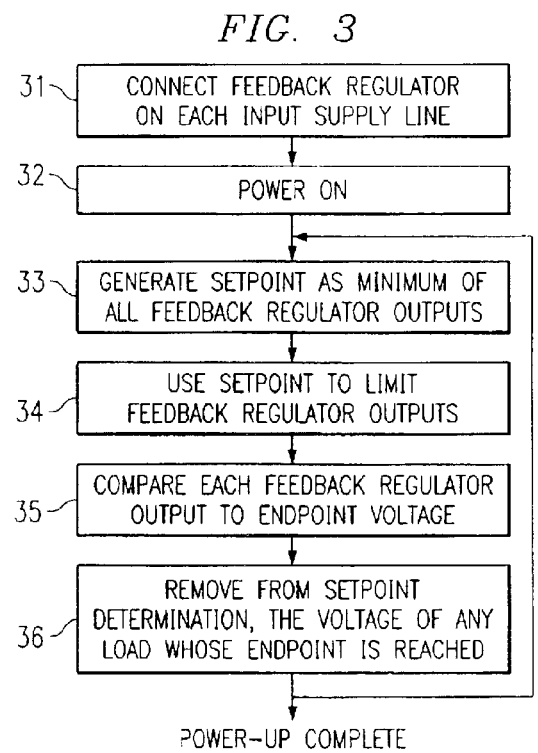
FIG. 3 illustrates a method of powering up a multiple voltage system.

FIG. 3 illustrates the power-up process for a multiple voltage system in accordance with the invention, whether performed digitally or with an analog circuit. In Step 31, a feedback regulator is connected on each input supply line, as described above.

In Step 32, power is applied to the system. In Step 33, a setpoint is determined as the minimum of all outputs from the feedback regulators. In Step 34, the voltage to all loads is held down to the setpoint, using the feedback regulators.

In Step 35, it is determined whether the feedback regulator output to any load has reached an endpoint associated with that load. In Step 36, when any load is receiving a voltage near or equal to its endpoint voltage, the voltage to that load (or loads) no longer affects the determination of the setpoint.

The above steps continue, and as the output from each feedback regulator reaches the endpoint voltage for the associated load, it no longer affects the determination of the setpoint. Eventually, the setpoint reaches the maximum of the feedback regulator outputs, at which point, all loads are receiving their target voltages.

The same concepts as discussed above could also be adapted for application to power down methods and circuits. Each load could be limited to a maximum voltage as the system powers down, in increments, until the lowest load voltage is reached and the system is permitted to power down to zero.

Other Embodiments

Although the present invention has been described in detail, it should be understood that various changes, substitutions, and alterations can be made hereto without departing from the spirit and scope of the invention as defined by the appended claims.

What is claimed is:

1. A power-up control circuit for controlling the initial application of power to a system having multiple loads and multiple load voltage requirements, comprising:
    a feedback regulator associated with each load, connected between the load and its voltage supply signal, each regulator operable to deliver an output voltage signal to the associated load and to control the voltage of that output signal by limiting the voltage to the level of a setpoint signal;
    a voltage finder operable to receive output voltage signals from the feedback regulators, to determine the setpoint signal by finding the minimum voltage level of these signals, and to deliver the setpoint signal to each feedback regulator circuit; and
    a cutout circuit interposed between the output of each feedback regulator and the voltage finder, operable to compare the associated output voltage signal to a reference endpoint representing the voltage required by the associated load, and to cut out the associated voltage output signal from the voltage finder when the voltage delivered to the associated load reaches the reference endpoint.

2. The circuit of claim 1, further comprising a ramp rate control circuit operable to equalize the rate at which the voltage to each load increases.

3. The circuit of claim 1, wherein each feedback regulator circuit has a pulse width modulator for modulating the voltage supply signal to the associated load.

4. The circuit of claim 3, wherein the pulse width modulator controls a pass transistor.

5. The circuit of claim 1, wherein the reference endpoint voltage associated with each load is equal to the voltage required by the load.

6. The circuit of claim 1, wherein the reference endpoint voltage associated with each load is greater than the voltage required by the load.

7. The circuit of claim 1, wherein the voltage finder has a diode associated with each load, such that the anode of each diode is connected to a setpoint node and the cathode of each diode is connected to the output of the feedback regulator of the associated load.

8. The circuit of claim 1, wherein the cutout circuit has means for comparing two input signals and a cutout transistor responsive to the means for comparing.

9. A method of powering-up a system having multiple loads and multiple load voltage requirements, comprising:
    connecting a feedback regulator between each load and its input voltage supply;
    applying power to the voltage supplies;
    generating a setpoint signal by receiving outputs from the feedback regulators and finding the minimum voltage level of these outputs;
    delivering the setpoint signal to each feedback regulator;
    limiting the voltage delivered to each load, by delivering the voltage delivered to each load back to the feedback regulator as a feedback signal and using the setpoint signal to limit the output of the feedback regulators;
    determining when any feedback regulator is delivering a voltage equal to an endpoint voltage for the associated load;
    removing, from the set of feedback regulator outputs being used to find the setpoint, the feedback regulator output of any load receiving its endpoint voltage; and
    repeating the generating, delivering, limiting, determining, and removing steps until each load is receiving its endpoint voltage.

10. The method of claim 9, further comprising the step of controlling the ramp rate of the setpoint such that the voltage to each load rises at an equal rate.

11. The method of claim 9, wherein the limiting step is performed by pulse width modulating the voltage supply signal to the associated load.

12. The method of claim 9, wherein the determining step is performed for each load by comparing the reference endpoint voltage for that load to the output of the feedback regulator associated with that load.

13. The method of claim 9, wherein the endpoint voltage associated with a load is substantially the same as the voltage required by that load.

14. The method of claim 9, wherein the endpoint voltage associated with a load is greater than the voltage required by the load.

15. The method of claim 9, wherein the generating step is performed by connecting diodes between each feedback regulator outputs and a setpoint node, such that the anodes of all diodes are connected to the setpoint node and the cathodes are connected to the respective feedback regulator outputs.

16. The method of claim 9, wherein at least the generating step is performed with digital circuitry.

17. The method of claim 9, wherein the method is performed with analog circuitry.

18. A power-up control circuit for controlling the initial application of power to a system having multiple loads and multiple load voltage requirements, comprising:

a feedback regulator associated with each load, connected between the load and its voltage supply signal, each regulator operable to deliver an output signal to the associated load, and to control the voltage of the output signal by limiting the voltage to the level of a setpoint signal;

a voltage finder operable to receive output voltage signals from the regulators, to determine the setpoint signal by finding the minimum voltage level of these signals, and to deliver the setpoint signal to each feedback regulator circuit; and a cutout circuit associated interposed between the output of each feedback regulator and the voltage finder, operable to compare the associated output voltage signal to a reference endpoint representing the voltage required by the associated load, and to cut out the associated voltage output signal from the voltage finder when the voltage delivered to the associated load reaches the reference endpoint;

wherein at least the voltage finder and cutout circuit are implemented as analog circuits.

19. The circuit of claim 18, wherein the system has more than two loads, each having a different load voltage.

20. The circuit of claim 18, wherein the system has more than two loads, with at least two loads having the same load voltage, and wherein at least the voltage regulator of for these loads is shared.

* * * * *